US012566307B2

(12) United States Patent     (10) Patent No.:   US 12,566,307 B2

Trezise     (45) Date of Patent:    Mar. 3, 2026

---

(54) PULL-BACK FIBER OPTIC CABLE INSTALLATION FOR MULTI DWELLING UNITS

(71) Applicant: PPC BROADBAND FIBER LTD., Woodbridge (GB)

(72) Inventor: Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 18/637,280

(22) Filed: Apr. 16, 2024

(65) Prior Publication Data

US 2025/0004210 A1     Jan. 2, 2025

Related U.S. Application Data

(62) Division of application No. 16/893,384, filed on Jun. 4, 2020, now Pat. No. 11,960,124.

(Continued)

(51) Int. Cl.
| | |
|---|---|
| *G02B 6/38* | (2006.01) |
| *G02B 6/44* | (2006.01) |
| *G02B 6/46* | (2006.01) |

(52) U.S. Cl.
CPC ......... *G02B 6/4475* (2013.01); *G02B 6/3806* (2013.01); *G02B 6/3893* (2013.01);
(Continued)

(58) Field of Classification Search
CPC ... G02B 6/3806; G02B 6/3893; G02B 6/4455
(Continued)

(56) References Cited

U.S. PATENT DOCUMENTS

| | | | |
|---|---|---|---|
| 5,708,753 A | * | 1/1998 | Frigo ................... H04B 10/032 385/24 |
| 5,864,672 A | * | 1/1999 | Bodeep .............. H04N 7/17309 348/E7.07 |

(Continued)

FOREIGN PATENT DOCUMENTS

| | | | | |
|---|---|---|---|---|
| ES | 2608892 T3 | * | 4/2017 | ............... G02B 6/44 |
| JP | 2008129170 A | | 6/2008 | |

(Continued)

OTHER PUBLICATIONS

Search Report dated Sep. 14, 2020 in corresponding International Application No. PCT/US2020/036210, 4 pages.

(Continued)

*Primary Examiner* — Kaveh C Kianni
(74) *Attorney, Agent, or Firm* — MH2 TECHNOLOGY LAW GROUP LLP

(57) ABSTRACT

A pull-back fiber cable installation for multi dwelling units includes a first distribution point disposed between a first group of twelve units and a second group of twelve units, a second distribution point disposed between a third group of twelve units and a fourth group of twelve units, and a twelve fiber distribution cable optically connected to the first and second distribution points. Each fiber of the distribution cable is cut between the first and second distribution point. A first portion of the cut fiber is spliced to a first drop cable that runs to a first unit of the second group of twelve units, and a second portion of the cut fiber is spliced to a second drop cable that runs to a first unit of the third group of twelve units.

20 Claims, 3 Drawing Sheets

Related U.S. Application Data

(60) Provisional application No. 62/857,271, filed on Jun. 4, 2019.

(52) U.S. Cl.
CPC ............. *G02B 6/4455* (2013.01); *G02B 6/46* (2013.01); *G02B 6/4452* (2013.01)

(58) Field of Classification Search
USPC ......................................................... 385/70
See application file for complete search history.

(56) References Cited

U.S. PATENT DOCUMENTS

| | | | | | |
|---|---|---|---|---|---|
| 6,215,930 | B1 * | 4/2001 | Estes | ................... | G02B 6/4475 385/100 |
| 6,427,042 | B1 * | 7/2002 | Dyke | .................. | G02B 6/4472 385/100 |
| 6,542,267 | B1 * | 4/2003 | Nicholson | .......... | H04Q 11/0062 398/59 |
| H2075 | H * | 8/2003 | Gnauck | ............................ | 398/58 |
| 6,724,319 | B1 * | 4/2004 | Knaack | .................. | G01H 9/004 359/290 |
| 6,728,165 | B1 * | 4/2004 | Roscigno | ............... | G01H 9/004 181/102 |
| 10,063,313 | B1 * | 8/2018 | Al Sayeed | ............ | H04J 14/029 |
| 10,374,746 | B1 * | 8/2019 | Lawrence | ................. | H04L 5/14 |
| 10,585,256 | B1 * | 3/2020 | Henley | ................ | G02B 6/3807 |
| 2006/0093303 | A1 * | 5/2006 | Reagan | ................ | G02B 6/4441 385/76 |
| 2006/0193574 | A1 * | 8/2006 | Greenwood | ......... | G02B 6/4475 385/103 |
| 2006/0193575 | A1 * | 8/2006 | Greenwood | ......... | G02B 6/4495 385/100 |
| 2006/0245687 | A1 * | 11/2006 | Gall | ..................... | H04B 10/272 385/24 |
| 2006/0245688 | A1 * | 11/2006 | Gall | ..................... | H04B 10/272 385/24 |
| 2007/0140639 | A1 * | 6/2007 | Temple | ................ | G02B 6/4475 385/100 |
| 2007/0140640 | A1 * | 6/2007 | Temple | ................ | G02B 6/4475 385/100 |
| 2011/0075968 | A1 * | 3/2011 | Cao | ......................... | G02B 6/445 385/95 |
| 2011/0239266 | A1 * | 9/2011 | Brooks | .................. | H04B 10/85 398/141 |
| 2011/0311226 | A1 * | 12/2011 | Smith | .............. | H04B 10/25753 398/45 |
| 2011/0318003 | A1 * | 12/2011 | Brooks | .................... | G02B 6/35 398/45 |
| 2014/0226939 | A1 * | 8/2014 | Boxer | .................. | G02B 6/4401 385/106 |
| 2015/0355428 | A1 * | 12/2015 | Leeman | ............... | G02B 6/4454 385/135 |
| 2017/0235083 | A1 | 8/2017 | Sales Casals | | |
| 2018/0128982 | A1 * | 5/2018 | Jensen | .............. | G02B 6/44715 |
| 2018/0136426 | A1 | 5/2018 | Rousseaux | | |
| 2018/0213305 | A1 * | 7/2018 | Campos | ............. | H04Q 11/0005 |
| 2018/0248644 | A1 * | 8/2018 | Gronvall | .......... | H04B 10/25758 |
| 2020/0081215 | A1 | 3/2020 | Maricevic et al. | | |

FOREIGN PATENT DOCUMENTS

| | | | | |
|---|---|---|---|---|
| WO | 2007037845 | A2 | 4/2007 | |
| WO | 2008134848 | A1 | 11/2008 | |
| WO | WO-2013043235 | A2 * | 3/2013 | .......... G02B 6/4401 |
| WO | WO-2017139081 | A1 * | 8/2017 | ............... H04B 1/40 |

OTHER PUBLICATIONS

Written Opinion dated Sep. 14, 2020 in corresponding International Application No. PCT/US2020/036210, 12 pages.
Canadian Examination Report dated Jul. 9, 2025 in corresponding Canadian Application No. 3,142,275, 4 pages.

\* cited by examiner

200

101

BASE

210

230

232

DIST. POINT

DIST. POINT

F12
F11
F10
F9
F8
F7
F6
F5
F4
F3
F2
F1

C12 F1
D12
C13
D13
12

DWELLINGS 1-12
240

DWELLINGS 13-24
242

C25
F1
25
D25

DWELLINGS 25-36
244

C37
F1
37
D37

DWELLINGS 37-48
246

PULL-BACK FIBER OPTIC CABLE INSTALLATION FOR MULTI DWELLING UNITS

CROSS-REFERENCE TO RELATED APPLICATION

This application is a divisional of U.S. application Ser. No. 16/893,384, filed on Jun. 4, 2020, pending, which claims the benefit of U.S. Provisional Application No. 62/857,271, filed Jun. 4, 2019. The disclosure of the prior applications is hereby incorporated by reference herein in its entirety.

TECHNICAL FIELD

This disclosure relates generally to the field optical fiber networks. In particular, this disclosure relates to a pull-back fiber cable installation for multi dwelling units.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a distribution point, for example, a fiber distribution hub (FDH), which is typically located in the basement or vault of a multi-dwelling units (MDU) building in which the end users reside. A multi-fiber distribution cable typically leads out of the distribution hub to a fiber connection point that is typically located remote from the distribution hub.

A distribution cable can be connected optically to one or more drop cables. As used herein, a "drop cable" is an optical fiber cable that typically runs towards an apartment or office of an end user within a special duct fixed to the surface of the wall or housed within the thickness thereof. To connect the distribution cable to a drop cable, an optical fiber is pulled out of the distribution cable/duct and spliced to an end of an optical fiber of the drop cable. A fiber splice closure may provide environmental protection for the splicing, management, and storage of the drop cable.

In conventional installations, the distribution cable, for example, a twelve fiber or twenty-four fiber cable, runs toward the end users of the MDU. In some installations 100, two twelve fiber distribution cables may be used. As shown in FIG. 1, two twelve fiber distribution cables 110, 120 extend from a distribution point 130 to provide broadband or ultra-broadband communication services to twenty-four apartments of an MDU. The first cable 110 provides services to apartments 1-12, and the second cable 120 provides services to apartments 13-24. As the first cable 110 reaches apartment 1, a first one of the fibers F1 is removed from the first cable 110. The first fiber F1 is cut and the end of the fiber F1 that is still optically connected to the distribution point 130 is spliced to a drop cable D1 at a fiber splice closure C1. The drop cable D1 runs from the fiber splice closure C1 to apartment 1.

In the aforementioned installation, the remaining length of fiber F1 that was cut at the fiber splice closure C1 is therefore wasted as it runs the remaining length of the distribution cable to the distalmost apartment, for example, apartment 12. Or even worse yet, if both distribution cables 110, 120 run the entire length of all twenty-four apartments, even more length of fiber F1 is wasted. The amount of waste of each successive one of the fibers F2-F13 may be less than the previous, but there is still a wasted length of fiber associated with each apartment installation except for the distalmost apartment, for example, apartment 24.

In an alternative installation, the fiber distribution point may be centrally located at the MDU so that the range of drop cable run lengths is reduced, which in turn reduces the amount of wasted fiber relative to the aforementioned installation. However, the alternative installation would still produce wasted fiber optic cable lengths for the apartments that are not distalmost to the fiber distribution point.

Therefore, it may be desirable to provide a pull-back fiber cable installation for multi dwelling units that maximizes fiber utilization and thus minimizes wasted length of fiber.

SUMMARY

According to some embodiments of the disclosure, a single cable is installed down the corridor instead of multiple cables. Additional distribution points are created instead of a single distribution point receiving multiple distribution cables. The distribution cable is window cut and fibers are pulled back in varying directions depending on the location of the respective mating distribution box. Fiber that would typically remain dormant and unused is instead connected to the distribution box and used to service additional subscribers.

Placing distribution boxes in central location means that fibers can be pulled back in either direction (effectively, both ends of the fiber are used), and thus doubling the total number of accessible subscribers. If additional 'slave' distribution points are set up, the same 12-fiber cable can connect further subscribers (limitless) provided that the distributions points are all connected (using an additional cable).

Additionally for passive optical network (PON) installations, fiber from the same distribution cable is used to connect subscribers to the splitters, and to connect the splitters to the main distribution fiber. This installation negates the need to install additional cable to feed the inputs of the splitter modules.

In PON applications, the concept is to use 8 fibers to connect subscribers and to use the additional 4 fibers as the input fiber for the splitters. Where distribution points (containing splitter modules) are located between apartments as mentioned above, 1×16 way splitters can be used instead of 1×8 splitters. The 4 fibers that remain for the input of the splitter can therefore each power a splitter back to the main distribution point, allowing for up to 64 subscribers to be connected from a 12-fibre cable. If additional slave distribution points are created and connected in parallel, the number of apartments on a single floor that can be connected is limitless.

According to various embodiments of the disclosure, a fiber cable installation for multiple units includes a first distribution point disposed between a first group of units and a second group of units, a second distribution point disposed between a third group of units and a fourth group of units, and a fiber distribution cable optically connected with the first and second distribution points. The first group of units, the second group of units, the third group of units, and the fourth group of units include a first number of units, and the fiber distribution cable includes a second number of fibers that is greater than or equal to the first number of units. The first distribution point and the second distribution point are configured to be optically coupled with a base station of an optical access network so as to provide optical signals from the base station to the first, second, third, and fourth groups of units. A first fiber of the distribution cable is cut between the first and second distribution points, a first portion of the cut first fiber is configured to provide an optical signal to a first unit of the second group of units, and a second portion of the cut first fiber is configured to provide an optical signal to a first unit of the third group of units.

In some aspects of the fiber cable installation, the first portion of the cut first fiber is spliced to a first drop cable that runs to the first unit of the second group of units, and the second portion of the cut first fiber is spliced to a second drop cable that runs to the first unit of the third group of units.

In accordance with various embodiments of the disclosure, a passive optical network for multiple units includes a first splitter disposed between a first group of units and a second group of units, a second splitter disposed between a third group of units and a fourth group of units, and a fiber distribution cable optically coupling the first splitter and the second splitter to a distribution point. The first group of units, the second group of units, the third group of units, and the fourth group of units include a first number of units, and the fiber distribution cable includes a second number of fibers that is greater than the first number of units. A first fiber of the distribution cable is configured to provide an optical input to the first splitter, and a second fiber of the distribution cable is configured to provide an optical input to the second splitter. A third fiber of the distribution cable is cut between the first splitter and the second splitter, a first portion of the cut third fiber is configured to provide an optical signal to a first unit of the second group of units, and a second portion of the cut third fiber is configured to provide an optical signal to a first unit of the third group of units.

In some aspects of the passive optical network, the distribution point is configured to be optically coupled with a base station of an optical access network so as to provide optical signals from the base station to the first, second, third, and fourth groups of units.

In various aspects of the passive optical network, the first portion of the cut third fiber is spliced to a first drop cable that runs to the first unit of the second group of units, and the second portion of the cut third fiber is spliced to a second drop cable that runs to the first unit of the third group of units.

Some aspects of the passive optical network further include a third splitter disposed between a fifth group of units and a sixth group of units. The fiber distribution cable optically couples the third splitter to a distribution point, and a fourth fiber of the distribution cable is configured to provide an optical input to the third splitter.

In various aspects of the passive optical network, the third fiber of the distribution cable is cut between the third splitter and the second splitter, a third portion of the cut third fiber is configured to provide an optical signal to a first unit of the fourth group of units, and a fourth portion of the cut third fiber is configured to provide an optical signal to a first unit of the fifth group of units. In some aspects, the third portion of the cut third fiber is spliced to a third drop cable that runs to the first unit of the second group of units, and the fourth portion of the cut third fiber is spliced to a fourth drop cable that runs to the first unit of the third group of units.

In various aspects of the passive optical network, a fifth fiber of the distribution cable is cut between the third splitter and the second splitter. A first portion of the cut fifth fiber is configured to provide an optical signal to a first unit of the fourth group of units, and a second portion of the cut fifth fiber is configured to provide an optical signal to a first unit of the fifth group of units. In some aspects, the first portion of the cut fifth fiber is spliced to a third drop cable that runs to the first unit of the fourth group of units, and the second portion of the cut fifth fiber is spliced to a fourth drop cable that runs to the first unit of the fifth group of units.

In some aspects of the passive optical network, the fifth group of units and the sixth group of units include the first number of units.

According to some embodiments of the disclosure, an optical fiber network for multiple units includes a first optical module disposed between a first group of units and a second group of units, a second optical module disposed between a third group of twelve units and a fourth group of units, and a fiber distribution cable optically coupled with the first and second optical modules. The first group of units, the second group of units, the third group of units, and the fourth group of units include a first number of units, and the fiber distribution cable includes a second number of fibers that is greater than or equal to the first number of units. A first fiber of the distribution cable is cut between the first optical module and the second optical module, a first portion of the cut first fiber is configured to provide an optical signal to a first unit of the second group of units, and a second portion of the cut first fiber is configured to provide an optical signal to a first unit of the third group of units.

In some aspects of the optical fiber network, the first portion of the cut first fiber is spliced to a first drop cable that runs to the first unit of the second group of units, and the second portion of the cut first fiber is spliced to a second drop cable that runs to the first unit of the third group of units.

In various aspects of the optical fiber network, the first optical module is a first distribution point, and the second optical module is a second distribution point, and the first distribution point and the second distribution point are configured to be optically coupled with a base station of an optical access network so as to provide optical signals from the base station to the first, second, third, and fourth groups of units.

According to some aspects of the optical fiber network, the first optical module is a first splitter, and the second optical module is a second splitter. The first splitter and the second splitter are optically coupled with a distribution point, and a second fiber of the distribution cable is configured to provide an optical input from the distribution point to the first splitter, and a third fiber of the distribution cable is configured to provide an optical signal from the distribution point to the second splitter.

In some aspects of the optical fiber network, the distribution point is configured to be optically coupled with a base station of an optical access network so as to provide optical signals from the base station to the first, second, third, and fourth groups of units.

According to various aspects of the optical fiber network, the optical fiber network includes a third splitter disposed between a fifth group of units and a sixth group of units. The fiber distribution cable optically couples the third splitter to the distribution point, and a fourth fiber of the distribution cable is configured to provide an optical from the distribution point to the third splitter.

In various aspects of the optical fiber network, the first fiber of the distribution cable is cut between the third splitter and the second splitter, a third portion of the cut first fiber is configured to provide an optical signal to a first unit of the fourth group of units, and a fourth portion of the cut first fiber is configured to provide an optical signal to a first unit of the fifth group of units.

According to some aspects of the optical fiber network, wherein the third portion of the cut first fiber is spliced to a third drop cable that runs to the first unit of the fourth group of units, and wherein the fourth portion of the cut first fiber is spliced to a fourth drop cable that runs to the first unit of the fifth group of units.

In some aspects of the optical fiber network, a fifth fiber of the distribution cable is cut between the third splitter and the second splitter, a first portion of the cut fifth fiber is configured to provide an optical signal to a first unit of the fourth group of units, and a second portion of the cut fifth fiber is configured to provide an optical signal to a first unit of the fifth group of units.

According to various aspects of the optical fiber network, the first portion of the cut fifth fiber is spliced to a third drop cable that runs to the first unit of the fourth group of units, and the second portion of the cut fifth fiber is spliced to a fourth drop cable that runs to the first unit of the fifth group of units.

BRIEF DESCRIPTION OF THE FIGURES

For a further understanding of the invention, reference will be made to the following detailed description of the invention which is to be read in connection with the accompanying drawing and in which like numbers refer to like parts, wherein.

DETAILED DESCRIPTION

As a preface to the detailed description, it should be noted that, as used in this specification and the appended claims, the singular forms "a", "an" and "the" include plural referents, unless the context clearly dictates otherwise.

Figure 2:
FIG. 2 is a schematic illustration of an exemplary pull-back fiber cable installation for multi dwelling units in accordance with various aspects of the disclosure.

FIG. 2 illustrates a pull-back fiber cable installation 200 for multi dwelling units in accordance with various aspects of the disclosure. In the installation 200, a first distribution point 230 is disposed between two groups of twelve apartments—a first group 240 and a second group 242. The first group 240 includes apartments 1-12, and the second group 242 includes apartments 13-24. A second distribution point 232 is disposed between two groups of apartments—a third group 244 and a fourth group 246. The third group 244 includes apartments 25-36 and the fourth group 246 includes apartments 37-48. It should be appreciated that additional apartments and additional distribution points may be provided for larger MDUs. The distribution points 230, 232 provide an optical connection back to the base station or home of an FFTx optical access network.

Figure 1:
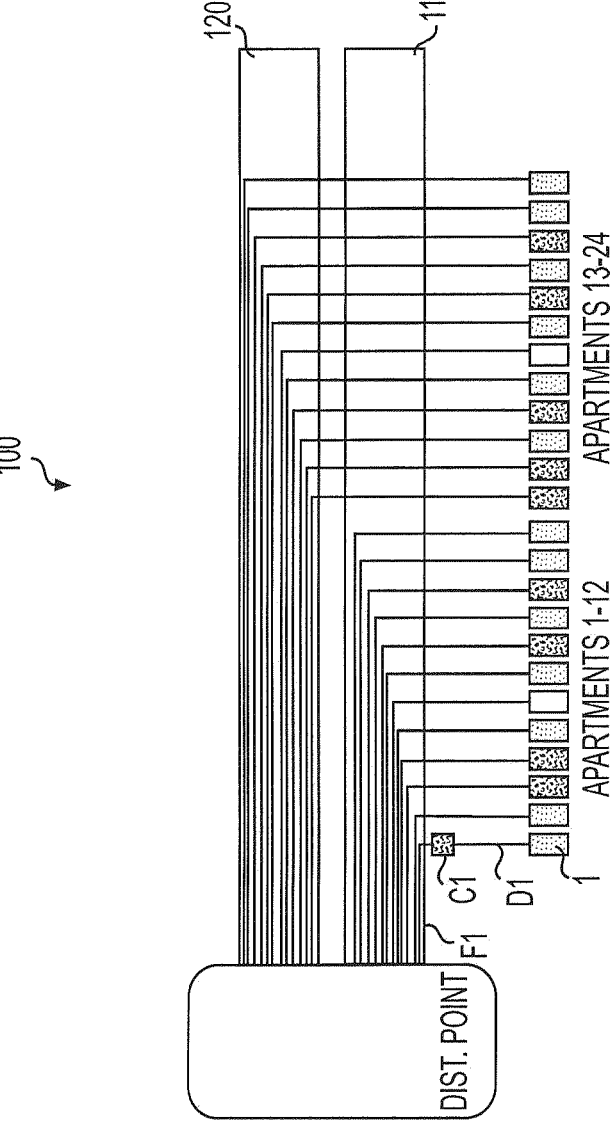
FIG. 1 is a schematic illustration of a conventional pull-back fiber cable installation for multi dwelling units.

A twelve fiber distribution cable 210 runs the length from apartment 1 to apartment 48 and is optically connected with the first and second distribution points 230, 232. As with the conventional installation described above with respect to FIG. 1, as the cable 210 extends from the first distribution point 230 and reaches apartment 12, a twelfth one of the fibers F12 is removed from the cable 210. The twelfth fiber F12 is cut and the end of the fiber F12 that is still optically connected to the first distribution point 230 is spliced to a drop cable D12 at a fiber splice closure C12. The drop cable D12 runs from the fiber splice closure C12 to apartment 12. The same occurs for fibers F1-F11. Thus, small amounts of fibers F2-F12 are wasted as the cable 210 extends to apartment 1.

As the cable 210 extends from the first distribution point 230 to the second distribution point 232, the cable 210 runs past apartments 13-24 (second group 242) and apartments 25-36 (third group 244). As the cable 210 extends from the first distribution point 230 and reaches apartment 13, the first fiber F1 is removed from the cable 210. The first fiber F1 is cut and the end of the fiber F1 that is still optically connected to the first distribution point 230 is spliced to a drop cable D13 at a fiber splice closure C13. The drop cable D13 runs from the fiber splice closure C13 to apartment 13. Similarly, fibers F2-F12 are cut and spliced and to drop cables that run to apartments 14-24.

However, rather than wasting lengths of the cut fibers F1-F12 that provide services to apartments 13-24, the remaining lengths of the fibers that are optically connected to the second distribution point 232 are spliced to drop cables that run to apartments 25-36. For example, the remaining length of fiber F1 is spliced to a drop cable D25 at a fiber splice closure C25. The drop cable D25 runs from the fiber splice closure C25 to apartment 25. Similarly, fibers F2-F12 are cut and spliced and to drop cables that run to apartments 25-36.

As the cable 210 extends from the second distribution point 232 and reaches apartment 37, the first fibers F1 is removed from the cable 210. The first fiber F1 is cut and the end of the fiber F1 that is still optically connected to the second distribution point 232 is spliced to a drop cable D37 at a fiber splice closure C37. The drop cable D37 runs from the fiber splice closure C37 to apartment 37. The same occurs for fibers F1-F11. If no other distribution points are used, small amounts of fibers F2-F12 are wasted as the cable 210 extends to apartment 48. If a third distribution point is used, rather than wasting lengths of the cut fibers F1-F12 that provide services to apartments 37-48, the remaining lengths of the fibers that are optically connected to the third distribution point are spliced to drop cables that run to apartments 49-60. The above-described pattern can be repeated as necessary.

Figures 3A, 3B:
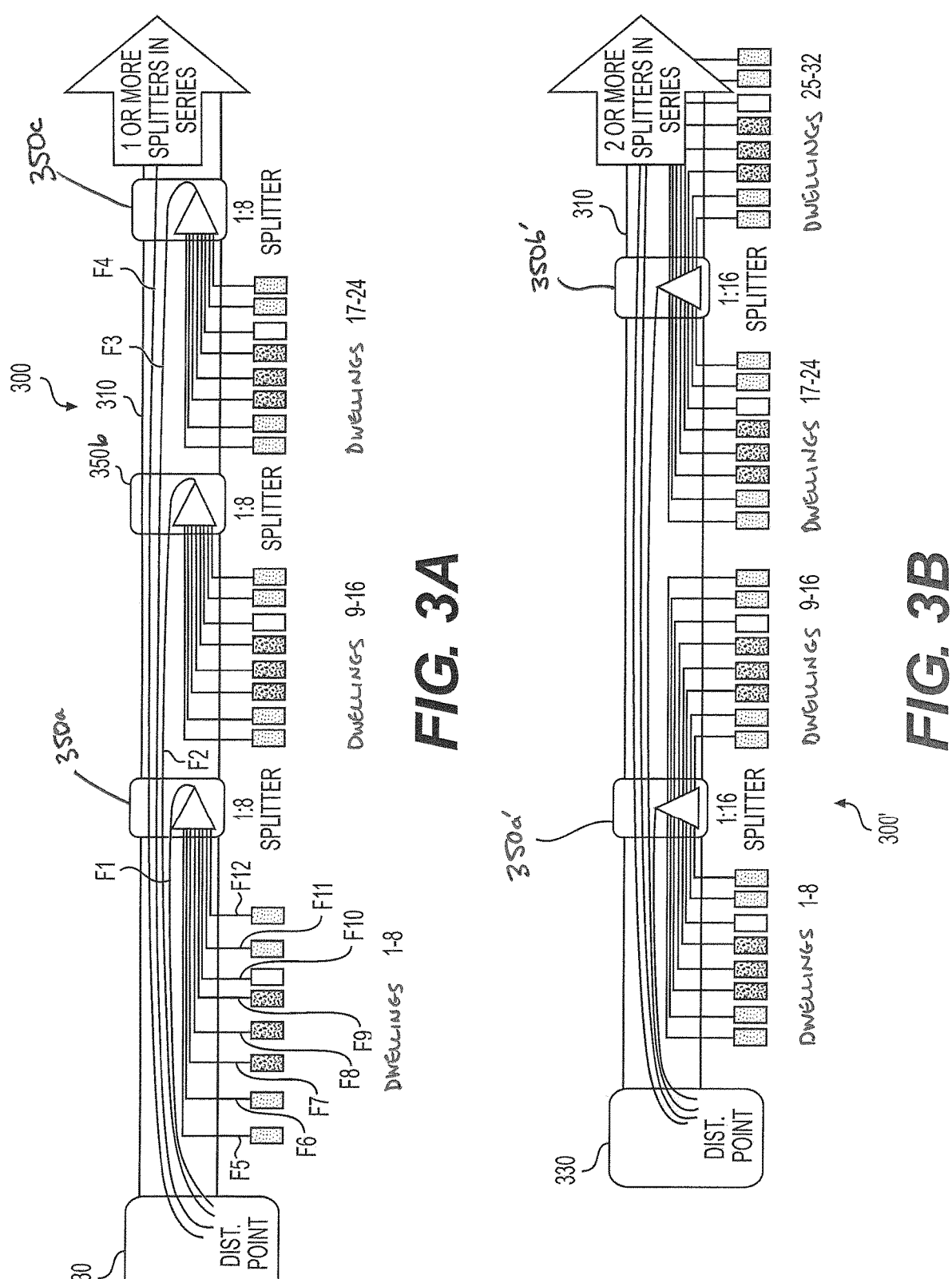
FIGS. 3A and 3B are schematic illustrations of an exemplary pull-back fiber cable installation in a passive optical network for multi dwelling units in accordance with various aspects of the disclosure.

Referring now to FIG. 3A, a pull-back fiber cable installation 300 for multi dwelling units in accordance with various aspects of the disclosure. The installation 300 is a passive optical network installation including a distribution point 330 and a twelve fiber distribution cable 310 that is optically connected to four splitters 350. In particular, a first one of the fibers F1 of the cable 310 optically connects the distribution point 330 with the first splitter 350, a second fiber F2 of the cable 310 optically connects the distribution point 330 with the second splitter 350, a third one of the fibers F3 of the cable 310 optically connects the distribution point 330 with the third splitter 350, and a fourth fiber F4 of the cable 310 optically connects the distribution point 330 with the fourth splitter 350.

Each of the splitters 350 is a 1:8 splitter. Thus, each of the remaining eight fibers F5-F12 of the distribution cable is cut and the end of the fiber that is still optically connected to the splitter is spliced to a drop cable at a fiber splice closure. Each drop cable runs from the fiber splice closure to an apartment. In the installation of FIG. 3A, up to thirty-two subscribes can be connected to the distribution point 330 (and thus to the FTTx optical access network) by the twelve fiber distribution cable 310.

In the installation 300' of FIG. 3B, each of the splitters 350' is a 1:16 splitter. Thus, each of the remaining eight fibers F5-F12 of the distribution cable is cut, and both cut ends are connected to a respective one of the splitters 350'. Then, either a fiber is spliced to a drop cable at a fiber splice closure as the distribution cable 310 extends past an apartment, or a fiber is cut and spliced to a drop cable at a fiber splice closure as the distribution cable 310 extends past an apartment. Each drop cable runs from the fiber splice closure to an apartment. Similar to the installation of FIG. 2, rather than wasting lengths of fiber, the remaining length of a cut fiber is optically connected to a successive one of the splitters 350'. In the installation of FIG. 3B, up to sixty-four subscribers can be connected to the distribution point 330 (and thus to the FTTx optical access network) by the twelve fiber distribution cable 310.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A fiber cable installation for multiple units comprising:
a first distribution point disposed between a first group of units and a second group of units;
a second distribution point disposed between a third group of units and a fourth group of units; and
a fiber distribution cable optically connected with the first distribution point and the second distribution point,
wherein the first group of units, the second group of units, the third group of units, and the fourth group of units include a number of units and wherein the fiber distribution cable includes a number of fibers that is greater than or equal to the number of units,
wherein the first distribution point and the second distribution point are configured to be optically coupled with a base station of an optical access network so as to provide optical signals from the base station to the first, second, third, and fourth groups of units, wherein a first fiber of the distribution cable is cut between the first distribution point and the second distribution point into a first portion of the first fiber and a second portion of the first fiber,
wherein the first portion of the first fiber is configured to provide an optical signal to a first unit of the second group of units from the first distribution point, and
wherein the second portion of the first fiber is configured to provide an optical signal to a first unit of the third group of units from the second distribution point.

2. The fiber cable installation of claim 1, wherein
the first portion of the first fiber is spliced to a first drop cable that runs to the first unit of the second group of units, and
wherein the second portion of the first fiber is spliced to a second drop cable that runs to the first unit of the third group of units.

3. The fiber cable installation of claim 1, further comprising:
a third distribution point disposed between a fifth group of units and a sixth group of units;
wherein the fiber distribution cable is optically connected with the third distribution point;
wherein the third distribution point is configured to be optically coupled with the base station so as to provide optical signals from the base station to the fifth and sixth groups of units,
wherein the first fiber of the distribution cable is cut between the second distribution point and the third distribution point into a third portion of the first fiber and a fourth portion of the first fiber,
wherein the third portion of the first fiber is configured to provide an optical signal to a first unit of the fourth group of units from the second distribution point, and
wherein the fourth portion of the first fiber is configured to provide an optical signal to a first unit of the fifth group of units from the third distribution point.

4. The fiber cable installation of claim 3, wherein
the third portion of the first fiber is spliced to a third drop cable that runs to the first unit of the fourth group of units, and
wherein the fourth portion of the first fiber is spliced to a fourth drop cable that runs to the first unit of the fifth group of units.

5. The fiber cable installation of claim 1, wherein the first distribution point comprises a first optical module and the second distribution point comprises a second optical module.

6. The fiber cable installation of claim 5, wherein the first optical module comprises a first splitter and the second optical module comprises a second splitter.

7. A fiber cable installation for multiple units comprising:
a first distribution point associated with a first group of units;
a second distribution point associated with a second group of units; and
a fiber distribution cable optically connected with the first distribution point and the second distribution point,
wherein the first distribution point and the second distribution point are configured to be optically coupled with a base station of an optical access network so as to provide optical signals from the base station to the first group of units and the second group of units,
wherein a first fiber of the fiber distribution cable is cut between the first distribution point and the second distribution points into a first portion of the first fiber and a second portion of the first fiber, wherein the first portion of the first fiber is configured to provide an optical signal to a first unit of the first group of units from the first distribution point, and wherein the second portion of the first fiber is configured to provide an optical signal to a first unit of the second group of units from the second distribution point.

8. The fiber cable installation of claim 7, wherein the first group of units and the second group of units include a number of units and wherein the fiber distribution cable includes a number of fibers that is greater than or equal to the number of units.

9. The fiber cable installation of claim 7, wherein the first portion of the first fiber is spliced to a first drop cable that runs to the first unit of the first group of units, and wherein the second portion of the first fiber is spliced to a second drop cable that runs to the first unit of the second group of units.

10. The fiber cable installation of claim 7, further comprising:

a third distribution point associated with a third group of units;

wherein the fiber distribution cable is optically connected with the third distribution point;

wherein the third distribution point is configured to be optically coupled with the base station so as to provide optical signals from the base station to the third groups of units, wherein the first fiber of the distribution cable is cut between the second distribution point and third distribution point into a third portion of the first fiber and a fourth portion of the first fiber, wherein the third portion of the first fiber is configured to provide an optical signal to a second unit of the second group of units from the second distribution point, and wherein the fourth portion of the first fiber is configured to provide an optical signal to a first unit of the third group of units from the third distribution point.

11. The fiber cable installation of claim 10, wherein the third portion of the first fiber is spliced to a third drop cable that runs to the second unit of the second group of units, and wherein the fourth portion of the first fiber is spliced to a fourth drop cable that runs to the first unit of the third group of units.

12. The fiber cable installation of claim 7, wherein the first distribution point comprises a first optical module and the second distribution point comprises a second optical module.

13. The fiber cable installation of claim 12, wherein the first optical module comprises a first splitter and the second optical module comprises a second splitter.

14. A fiber cable installation for multiple units comprising:

a first distribution point structurally configured to be optically coupled with a first group of units and a second group of units;

a second distribution point structurally configured to be optically coupled with a third group of units and a fourth group of units; and a fiber distribution cable configured to be optically coupled with the first distribution point and the second distribution point, wherein the first group of units, the second group of units, the third group of units, and the fourth group of units include a number of units and wherein the fiber distribution cable includes a number of fibers that is greater than or equal to the number of units, wherein a first fiber of the distribution cable is cut into a first portion and a second portion, wherein the first portion of the first fiber is configured to provide an optical signal to a first unit of the second group of units from the first distribution point, and wherein the second portion of the first fiber is configured to provide an optical signal to a first unit of the third group of units from the second distribution point.

15. The fiber cable installation of claim 14, wherein the first distribution point and the second distribution point are configured to be optically coupled with a base station of an optical access network so as to provide optical signals from the base station to the first, second, third, and fourth groups of units.

16. The fiber cable installation of claim 14, wherein the first portion of the first fiber is spliced to a first drop cable that runs to the first unit of the second group of units, and wherein the second portion of the first fiber is spliced to a second drop cable that runs to the first unit of the third group of units.

17. The fiber cable installation of claim 14, further comprising:

a third distribution point disposed between a fifth group of units and a sixth group of units;

wherein the fiber distribution cable is optically connected with the third distribution point;

wherein the third distribution point is configured to be optically coupled with the base station so as to provide optical signals from the base station to the fifth and sixth groups of units, wherein the first fiber of the distribution cable is cut between the second distribution point and the third distribution point into a third portion of the first fiber and a fourth portion of the first fiber, wherein the third portion of the first fiber is configured to provide an optical signal to a first unit of the fourth group of units from the second distribution point, and wherein the fourth portion of the first fiber is configured to provide an optical signal to a first unit of the fifth group of units from the third distribution point.

18. The fiber cable installation of claim 17, wherein the third portion of the first fiber is spliced to a third drop cable that runs to the first unit of the fourth group of units, and wherein the fourth portion of the first fiber is spliced to a fourth drop cable that runs to the first unit of the fifth group of units.

19. The fiber cable installation of claim 14, wherein the first distribution point comprises a first optical module and the second distribution point comprises a second optical module.

20. The fiber cable installation of claim 19, wherein the first optical module comprises a first splitter and the second optical module comprises a second splitter.

\* \* \* \* \*